310-337 SR CROSS REFERENCE SEARCH ROOM

XR 3,470,394

DOUBLE SERRATED CRYSTAL TRANSDUCER

Filed Nov. 9, 1967 2 Sheets-Sheet 1

RUFUS L. COOK
LUCIUS D. WHATLEY, JR.
INVENTORS

BY William F. Skeer
Agent
Don D. Doty
Attorney

DOUBLE SERRATED CRYSTAL TRANSDUCER
Filed Nov. 9, 1967 2 Sheets-Sheet 2
FIG. 5
FIG. 4
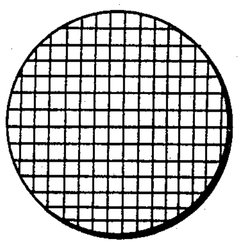
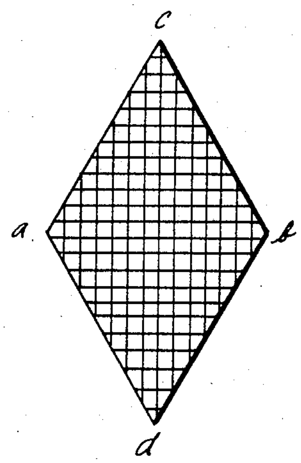
FIG. 6
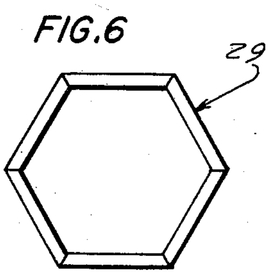
FIG. 7
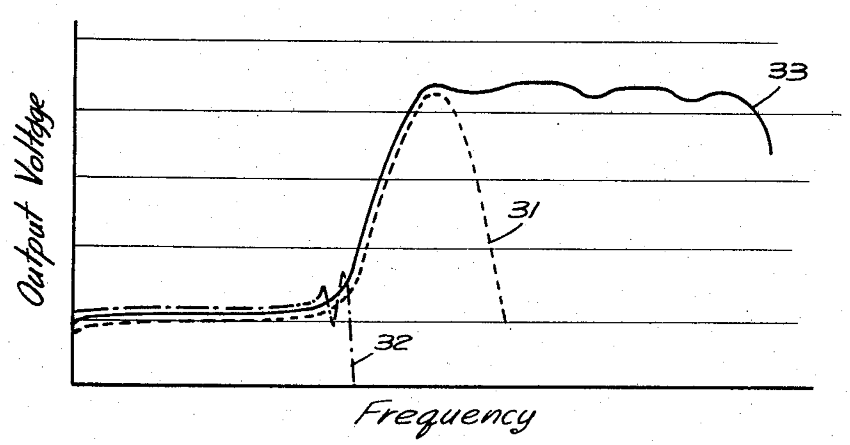
FIG. 8
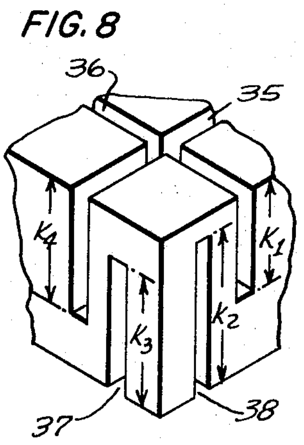
RUFUS L. COOK
LUCIUS D. WHATLEY, JR.
INVENTORS
BY William T. Skeer
Agent
Dax D. Doty
Attorney United States Patent Office 3,470,394
Patented Sept. 30, 1969

3,470,394
DOUBLE SERRATED CRYSTAL TRANSDUCER
Rufus Lee Cook and Lucius D. Whatley, Jr., Panama City, Fla., assignors to the United States of America as represented by the Secretary of the Navy
Filed Nov. 9, 1967, Ser. No. 681,725
Int. Cl. H04r *17/10, 1/00*
U.S. Cl. 310—8.0 11 Claims

ABSTRACT OF THE DISCLOSURE

A reversible piezoelectric transducer which has improved wideband performance due to serrations on opposite, parallel faces of the piezoelectric crystal.

This invention relates to piezoelectric transducers which are constructed to be reversible—that is, convert electrical energy to mechanical energy as well as convert mechanical energy to electrical energy—and to operate over a wide frequency range. More particularly, this invention relates to a piezoelectric transducer which is structurally figured by a system of cuts on opposite faces of the piezoelectric crystalline material, such that the response of the crystal is altered to obtain a very low mechanical Q in comparison to crystal transducers of previously known constructions, thereby causing it to operate in the high output portion of its operational curve.

The resonance characteristics of piezoelectric crystals has limited their use in wide band type transducer devices. In order to obtain a response over any appreciable frequency range, the crystalline material was sometimes combined with mechanically resonant structure to limit the operation of the crystal to the linear portion of the operational curve. This type of transducer is very inefficient, since the linear portion of a piezoelectric response curve is of the order of ten decibels below the resonance point of the curve. Too, the intricacy of the construction of a mechanically loaded transducer results in a device which is so complex and bulky that its utility is seriously diminished in highly mobile or deep sea applications. Further, it is difficult to shape the piezoelectric crystal or to group a plurality thereof in such manner as to produce a desired directivity pattern when mass loading techniques are used.

Another construction utilizing conventional piezoelectric configurations in transducer asemblies employs an electronic circuit which operates at the desired frequency range to drive or be driven by the transducer. The cut-off limits of such circuit can be so designed and constructed as to limit the frequency range of the combination construction to the linear portion of the operational curve of the transducer piezolectric element. The disadvantages of such a construction, aside from the low efficiency attendant operation of this portion of the curve, are that the housing which encloses the transducer and associated circuitry must have either a contained source of electrical power or a more complex electrical conductor and housing construction to accommodate this conductor. Such a construction is more bulky, costly and subject to mechanical failures than many highly mobile and deep sea applications require.

It is not uncommon in the art to encounter both mass loading and combined circuitry techniques applied to the same transducer, but such a device is quite complex, and, therefore, when it is housed in an enclosure capable of wi hstanding the prodigious pressure of the bathyal deep, it is ponderous, as well as costly.

The device of the instant invention dispatches the notion that broadband sonic transducers require such a mass loading technique or a critically-designed, complexly-encapsulated circuitry, or, worse, a cumbersome combination of the two. The transducer herein disclosed not only structurally disentangles the piezoelectric element, but provides a higher efficiency, improved operation not obtainable from the devices known prior to this, now disclosed, advanced construction.

It is accordingly, an object of this invention to produce a reversible piezoelectric transducer which has a low Q value, a wide range linear frequency response, and a high efficiency.

It is a further object of this invention to provide a low Q piezoelectric transducer structure which converts electrical signals to compressional waves and vice versa and operates over a wide frequency range in the audio frequency band without the use of mechanical frequency determining means or frequency limiting electronic circuitry.

It is a further object of this invention to provide a reversible piezoelectric audio transducer capable of operating over a wide range with attendant high efficiency and which is further characterized as possessing a low mass, simplified mechanical construction, and capable of being constructed utilizing conventional techniques.

This invention has an additional object, namely, the manufacture of a piezoelectric transducer which is operable over a broad range of frequencies without loss in efficiency, which can be arranged and shaped to produce a desired directivity by employing the same techniques as used in single or narrow band transducer technology, and which may be made with a minimum of conventional manufacturing steps.

A specific object of this invention is to provide an improved piezoelectric transducer having a piezoelectric element characterized as including parallel planar faces with figuring grooves cut into each thereof at right angles thereto.

Other objects and many of the attendant advantages will be readily appreciated as the subject invention becomes better understood by reference to the following detailed description, when considered in conjunction with the accompanying drawings wherein:

FIGS. 4 and 5 show the piezoelectric stock material formed into two possible configurations.

FIG. 6 shows a plurality of piezoelectric transducer elements arranged in a closed configuration for omnidirectional operation.

FIG. 7 illustrates a family of operational curves useful in understanding the device.

FIG. 8 shows a modified form of the piezoelectroc stock material of the invention.

Figure 1:
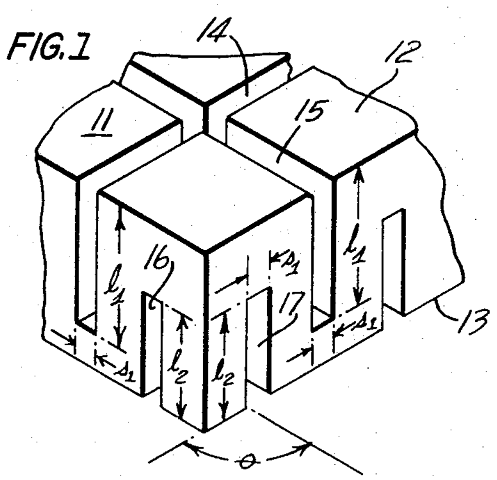
FIG. 1 is an illustration of a geometrical configuration of the piezoelectric element of the subject invention.

Referring to FIG. 1 there is shown a sheet of stock material, generally designated 11, made of a piezoelectric ceramic material such as, for example, lead zirconate. The sheet has parallel top and bottom faces 12 and 13. Face 12 is cut to produce a series of parallel cuts, serrations, or grooves, one of which is shown at 14. These grooves 14 are of a width diagrammatically designated as $s_1$, are of a depth $l_1$, and are perpendicular to face 12. A second series of cuts, serrations, or grooves, one of which is shown at 15, is cut in face 12 intersecting the aforesaid first series of cuts 14 at an angle of 90°. Like cuts 14, cuts 15 are of a depth designated in the drawing as $l_1$ and of a width $s_1$. A similar series of cuts 16 and 17 are cut in face 13. These cuts are likewise at right angles to the crystal face 13 but each series is of a depth diagrammatically shown as $l_2$ and of a width similarly indicated as $s_2$. The intersecting cuts in the face 13 are shown as being parallel to those in face 12, which means that the cuts 17 intersect cuts 14 at an angle of 90°. Similarly, cuts 16 intersect cuts 15 at 90°. This angle of intersection is shown as the angle $\theta$ in FIG. 1.

Figure 2:
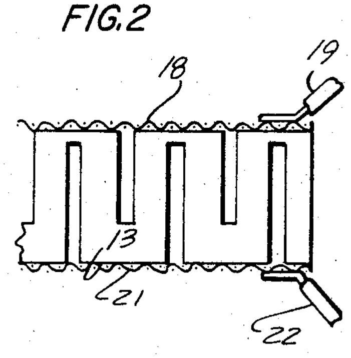
FIG. 2 is an illustration of the device of FIG. 1 with electrodes attached.

Referring to FIG. 2, the structure shown in FIG. 1 is shown with electrodes attached. Specifically, a nickel wire mesh, which is preferably in the thickness range of 0.002 to 0.004 inch, constitutes electrode 18 and is soldered to face 12 by a known soldering technique. A similar electrode 21 of nickel wire mesh is soldered to face 13. Two electrodes 18 and 21, are attached to leads 19 and 22, respectively.

Figure 3:
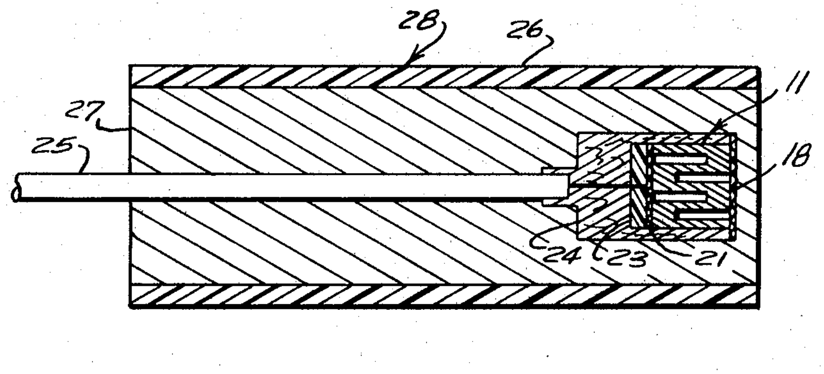
FIG. 3 is an illustration of a representative housing assembly for the transducers of the invention.

The simply made construction of FIG. 2 may be housed to constitute a complete transducer without complex mass loading constructions by using the mounting structure of FIG. 3. Transducer body 11 is attached to a phenolic base 23 by a conventional cement such as an epoxy, for example. The assembly is placed in a fitted wooden block 24, which may be constructed of balsa. A coaxial cable 25 is attached, and the cable and transducer assembly are placed in a phenolic cylinder 26. A potting material 27, known under the trademark "Scotchcast," is then poured in the cylinder and allowed to harden. The resulting transducer head 28 may be used for testing purposes or as an operational unit when cable 25 is connected to associated circuitry.

Either before or after the attachment of the wire mesh electrodes 18 and 21, the piezoelectric material may be shaped as a disc, as shown in FIG. 4, or as a rhombic form, as shown in FIG. 5, to facilitate their use in transducers. The proportions of the rhombic form may be altered if it is desired to modify the directivity of the transducer, the pattern being determined by the known relationships of the minor chord *ab* and major chord *cd*, as in the case of high Q unfigured transducers. A plurality of units may be connected in such a fashion as to produce an omnidirectional transducer. One such omnidirectional array is shown as a closed hexagon 29 in FIG. 6.

The profound improvement over the prior art transducers afforded by this simple construction may be appreciated by examining FIG. 7, which shows a relative frequency versus voltage output curve for the device constituting this invention, a conventional piezoelectric crystal, and a mass damped electronically limited prior art transducer, all operating over the same frequency range.

Curve 31 indicates the general response curve of a piezoelectric transducer. It may be observed that the curve is linear in the lower frequency range but becomes nonlinear and reaches a sharply defined peak at resonance. The relative difference in output between the resonance peak and the linear portion of the curve is of the order of 10 db.

The most commonly employed type of broad band transducer has its operational curve represented by curve 32. It should be noted that the low frequency portion thereof has its extreme end roll-off compensated, and at the portion of the curve where the transducer would become resonant, the curve shows the sharply nonlinear damped cutoff afforded by the associated mass damping. Thus, it may be seen that, despite the low end boost, the available linear bandwidth is about the same as a normal transducer crystal.

The transducer of the instant invention has its operational curve shown by curve 33. Inspection thereof will disclose that the high output portion of the curve has a much broader peak than the normal piezoelectric transducer and, discounting gradual variations, the high output portion of the curve remains essentially linear for an even wider range of frequencies than the low output portion of the curve. The slight variations from linearity are easily compensated for by appropriate design of associated electronic circuitry, in contrast to the sharply occurring peaks introduced by mass dampings, and the high output level makes it practical to locate the associated circuitry remote from the transducer, thereby greatly simplifying the construction of the encasing of the transducer and affording a reduction in cost and complexity of the assembled system.

It will, of course, be appreciated that the principles of this invention are applicable over a wide range of frequencies and, consequently, over a considerable range of sizes of transducer elements.

The figuring of the transducer is a precision operation requiring extreme care; however, some latitude in design exists as will be apparent to those artisans who are proficient in the design of piezoelectric materials. Accordingly, the depths of the cuts may be varied and the angle of intersection of the cuts on opposite faces may be between 90° and 45° depending on design parameters and the desires of the designers. FIG. 8 illustrates a piezoelectric stock blank shaped as in FIG. 1 except that each of the series of cuts 35, 36, 37, and 38 are of different depths illustrated as $k_1$, $k_2$, $k_3$, and $k_4$. This is more practical when the material is relatively thick for example on the order of 0.750 inch. On thinner crystals, for example, in the range of 0.040 inch, the limiting of the number of cut depths to two is a manufacturing convenience. An entirely satisfactory operation has been obtained using only two depths where $l_1$ is equal to 0.822 of the crystal thickness and $l_2$ is 0.608 of the crystal thickness. The cuts on each face may have one series of each of the two depths, if desired. The cuts are normally of the same thickness, that is, $s_1=s_2$. The actual width of the cuts is determined by the width of the cutting tool. A diamond circular saw and a wire saw have been used successfully for producing these cuts.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

The invention described herein may be manufactured and used by or for the Government of the United States of America for governmental purposes without the payment of any royalties thereon or therefor.

What is claimed is:

1. An electromechanical transducer comprising:
   a sheet of piezoelectric ceramic having substantially parallel oppositely disposed faces;
   a first series of parallel serrations located in each of said substantially parallel oppositely disposed faces;
   a second series of parallel serrations located in each of said substantially parallel oppositely disposed faces at right angles to said first series of parallel serrations; and
   an electrode means attached to each of the aforesaid substantially parallel oppositely disposed faces.

2. The device of claim 1 wherein said sheet of piezoelectric ceramic comprises a lead zirconate material.

3. The device of claim 1 wherein the serrations of said first and second series of parallel serrations located in one of said faces is of a common depth that is different from the common depth of the serrations of said first and second series of parallel serrations located in the other of said faces.

4. The device of claim 1 wherein the serrations of said first series of parallel serrations disposed in each face has a common depth which is different from the common depth of the serrations of said second series of serrations disposed in each face.

5. The device of claim 1 wherein the depths of the serrations in one of said faces are 0.822 of the thickness of said piezoelectric ceramic sheet and the depths of the serrations in the other of said faces are 0.608 of the thickness of said piezoelectric ceramic sheet.

6. The device of claim 1 wherein the depths of the serrations of said first series of serrations are 0.822 of the thickness of said sheet and the depths of the serrations of said second series of serrations are 0.602 of the thickness of said sheet.

7. The device of claim 1 wherein the serrations of said first series of serrations have a common depth in one of said faces that is different from the common depth thereof in the other of said faces and the serrations of said second series of serrations have a common depth in one of said faces that is different from the common depth thereof in the other of said faces and also different from either of the depths of said first series of serrations.

8. The device of claim 1 wherein said electrode means comprises a predetermined wire mesh.

9. The device of claim 1 wherein all of the serrations located in one face of said parallel oppositely disposed faces are of sufficient depth to overlap all of the serrations located in the other face of said parallel oppositely disposed faces.

10. The device of claim 1 wherein said first and second series of parallel serrations are located in each of said oppositely disposed faces in such manner as to cause the serrations of said first and second series of parallel serrations to intersect at angles between 45° and 90°, respectively.

11. The invention according to claim 1 further characterized by a housing means disposed around the electromechanical transducer of the invention in such manner as to provide waterproof encapsulation therefor while effectively exposing at least one of said parallel oppositely disposed faces to the ambient environmental medium for acoustical energy transfer therebetween.

References Cited

UNITED STATES PATENTS

| | | | |
|---|---|---|---|
| 3,059,130 | 10/1962 | Robins | 310—9.6 |
| 2,716,708 | 8/1955 | Bradfield | 310—9.6 |

MILTON O. HIRSHFIELD, Primary Examiner

MARK O. BUDD, Assistant Examiner

U.S. Cl. X.R.

310—9.5, 9.6; 333—72